United States Patent [19]

Lunden

[11] 3,904,046

[45] Sept. 9, 1975

[54] LUMBER STACKING APPARATUS

[75] Inventor: Sidney L. Lunden, Spokane, Wash.

[73] Assignee: Moore-Iem, Inc., Spokane, Wash.

[22] Filed: Aug. 16, 1974

[21] Appl. No.: 497,909

[52] U.S. Cl............... 214/6 DK; 214/6 G; 271/189
[51] Int. Cl.²..................................... B65G 57/10
[58] Field of Search........ 214/6 DK, 6 M, 6 G, 6 H; 271/189

[56] References Cited
UNITED STATES PATENTS

| | | | |
|---|---|---|---|
| 3,456,815 | 7/1969 | Carrels............................ | 214/6 DK |
| 3,737,052 | 6/1973 | Lunden............................ | 214/6 DK |
| 3,743,113 | 7/1973 | Eaton et al...................... | 214/6 DK |

*Primary Examiner*—Robert J. Spar
*Assistant Examiner*—Leslie J. Paperner
*Attorney, Agent, or Firm*—Wells, St. John & Roberts

[57] ABSTRACT

A lumber stacking apparatus for successively placing courses of boards one on another to form an upright stack. The apparatus includes a course support means operated by a drive means to: (1) engage and lift a course of boards from a course pickup station; (2) hold the course elevated while moving it forwardly to a stacking station; (3) lowering the course toward the top layer of a stack; and (4) retracting the course support means from beneath the course of boards to deposit it onto the stack. The apparatus includes a horizontally oriented drive crank means for reciprocating the course support means in a forward and backward direction. A "crown" cam and follower arrangement operatively cooperate with the drive crank means to affect upward and downward movement of the course support means at the course pickup and stacking stations.

12 Claims, 10 Drawing Figures

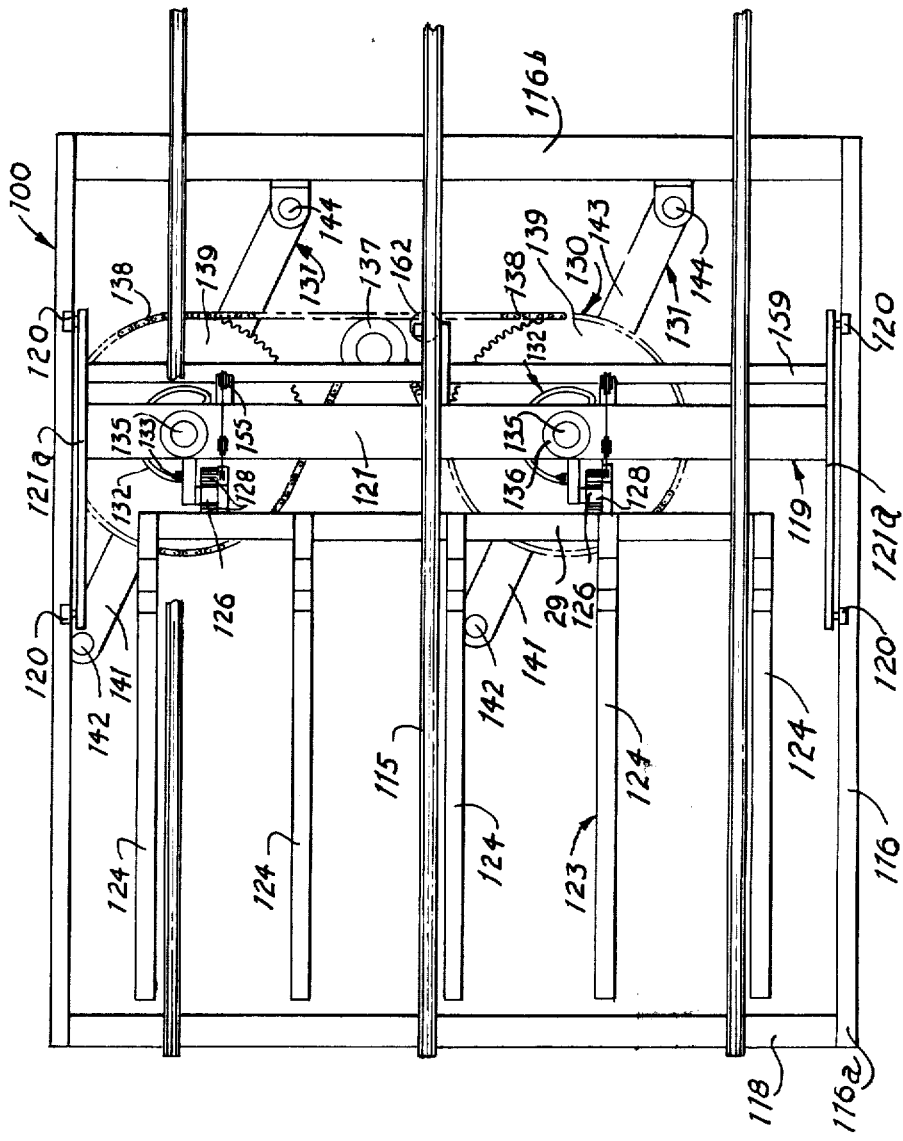

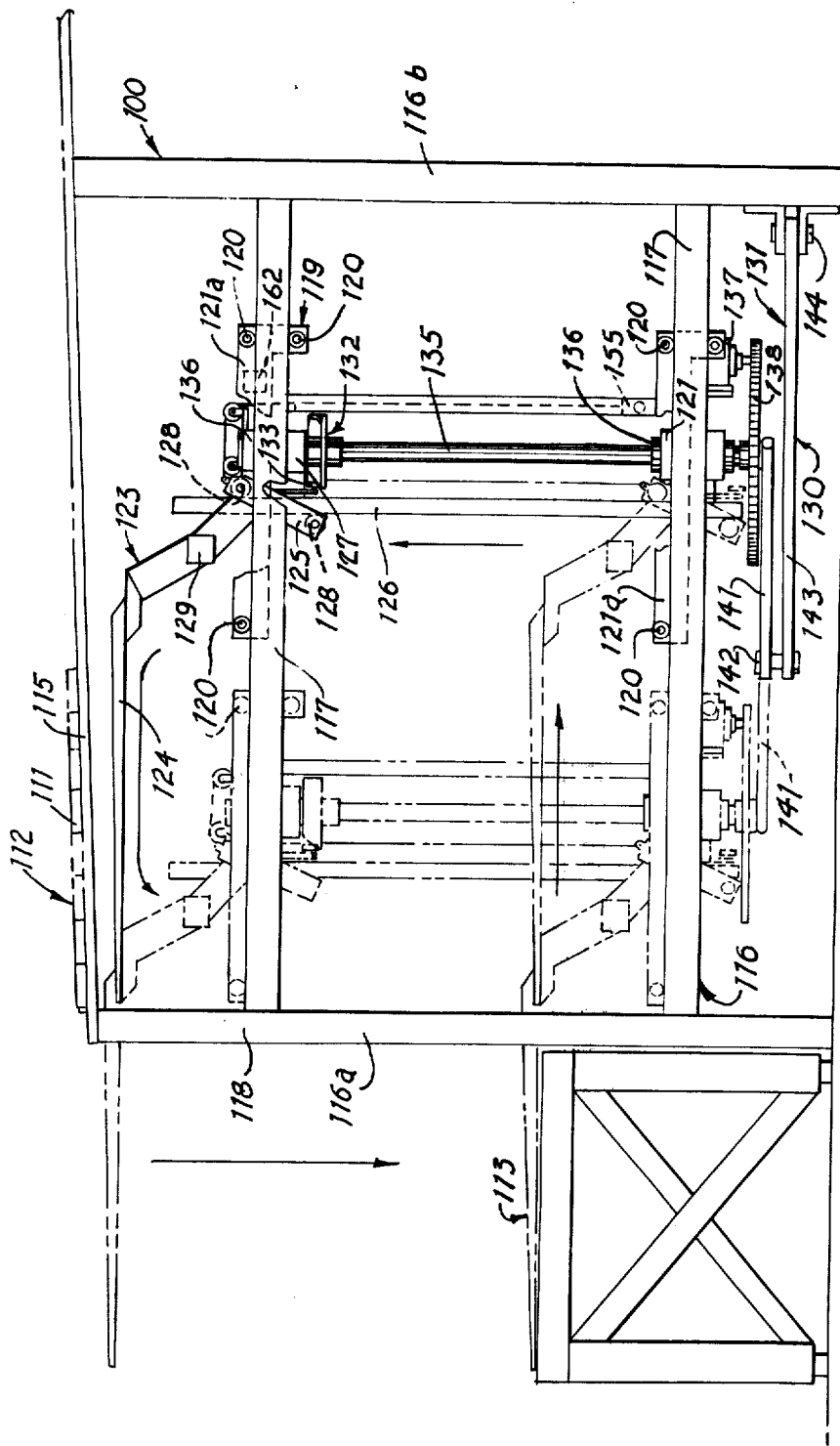

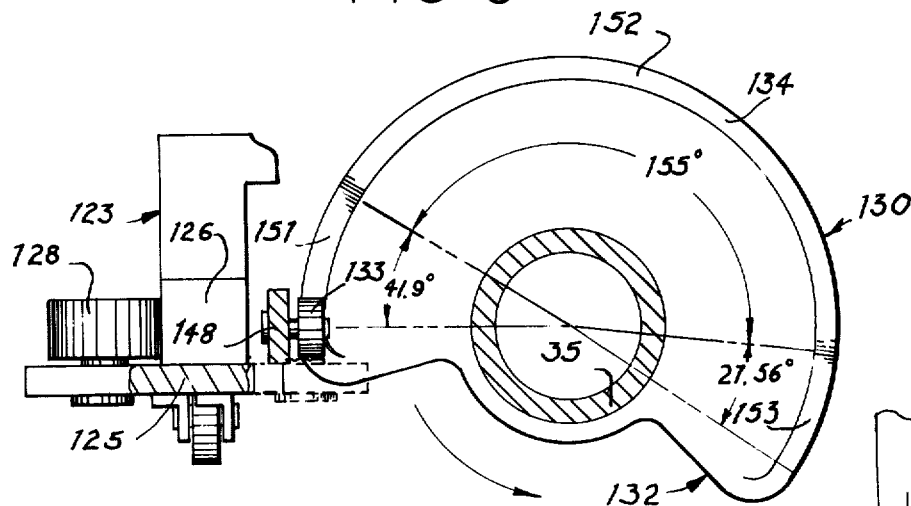
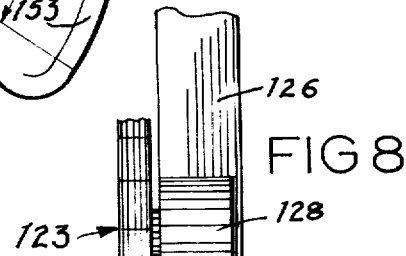
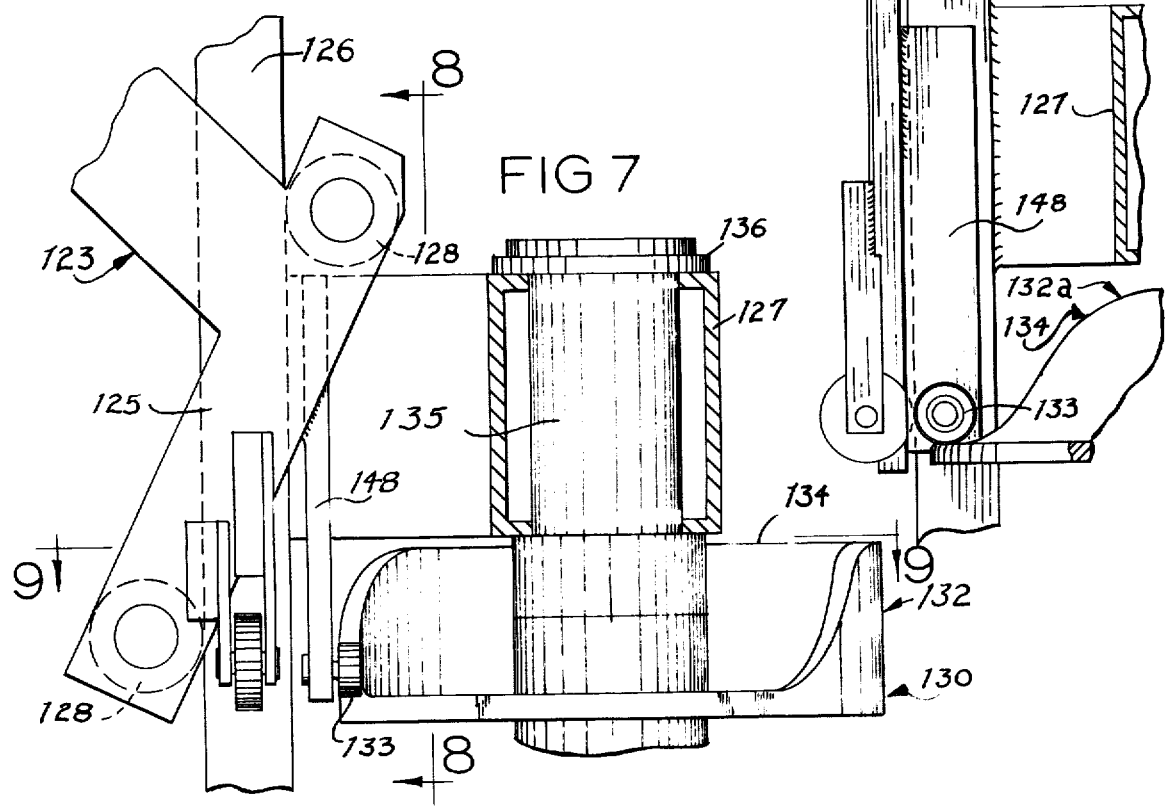

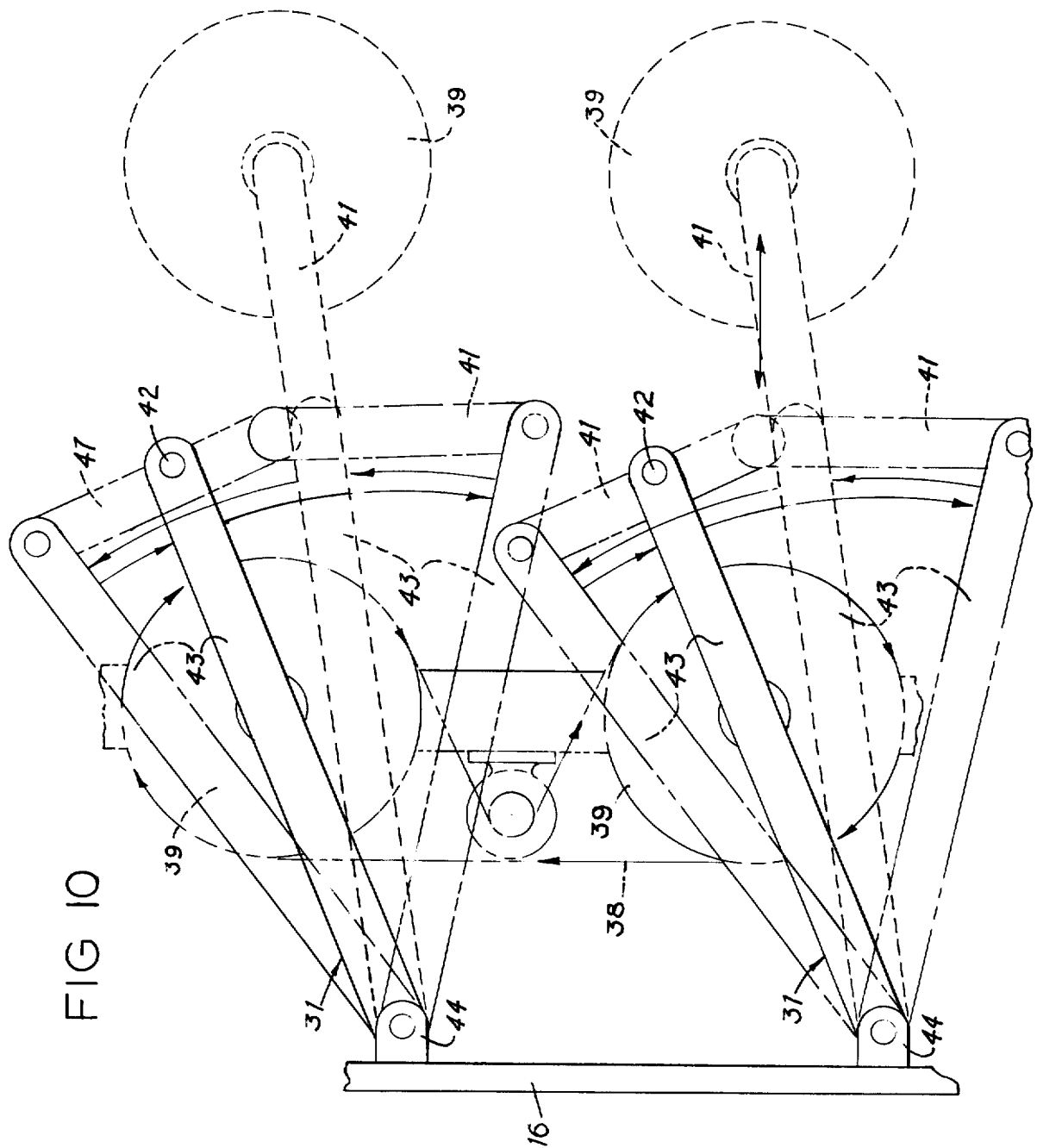

3,904,046

LUMBER STACKING APPARATUS

BACKGROUND OF THE INVENTION

This invention relates to lumber stacking machines, and more particularly to drive mechanisms for such machines.

Many lumber stackers utilize a forked arm arrangement that is sequentially moved upward to pick up a course of boards at a course formation station, then forward to carry the course over a course stacking station in front of a stripping mechanism, and is finally retracted to move the course against the stripping mechanism to remove the fork arms from underneath the course and allow the course to be deposited onto the top of a stack.

Various types of arrangement have been provided to lift the forked arm structure vertically to pick up a course of boards and carry the boards to a stacking station and then lower the boards in front of a stripping means. Ramp arrangements have been provided for raising the forked arm support vertically as the carriage is moved forward to pick up a course and carry it forward. A descending ramp, provided at the end of the stroke, then allows the forked arm assembly to drop in front of a stripping mechanism. An example of such a ramp arrangement is shown in the Lunden U.S. Pat. No. 3,437,215. Lift mechanisms have been provided to raise and lower forked arm assemblies in coordination with a reciprocating drive. Most frequently, reciprocating drives include a hydraulic cylinder for reciprocating a carriage along a horizontal path. The vertical lift arrangement with such reciprocating drive is provided by a coordinated hydraulic cylinder on the carriage such as illustrated in the Mason U.S. Pat. No. 3,169,646. Complex hydraulic equipment and controls are required to sequence the correct operation and provide for the desired acceleration of the forked arm structure to prevent the course from sliding or slipping on the fork arms as the carriage is being accelerated and decelerated.

Another Lunden U.S. Pat. No. 3,737,052 discloses several crank mechanisms to provide the advantage of a smooth acceleration of the carriage at the beginning of a stroke and gradual and smooth deceleration at the end of carriage travel, in conjunction with means for lifting a fork arm assembly vertically on the carriage at the beginning of the stroke to pick up a course of boards and to lower the course at the stacking station. The operation crank drive linkage of this device functions in a vertical plane wherein the crank arms and connecting links move about horizontal axes. The course pickup or layer handling means is operated as an integral function of the carriage drive linkage and is thereby somewhat restricted to operate in coordination with or in designed opposition to the movement of the carriage. The crank arms of these machines are mounted to the framework for rotations about a horizontal axis. The paths of the crank arms are therefore located in a vertical plane. Vertical clearance must be provided between the axes of the crank arms and the layer receiving surface of the machine to allow passage of the crank arms as they rotate. The length of the crank arms has a direct influence on the overall height of the stacking machine. If the distance travelled by the carriage is to be lengthened, the crank arms must also be lengthened and the layer receiving surface must be raised accordingly. This design retraction limits utilization of such stacking machines in areas with low elevational space requirements.

The overall length of the above machines is also effected by the length of the crank arms and by the location of their axis of rotation on the machine framework. In a position where the carriage is located at an extended, stacking position, the crank arms and connecting links are co-extensive. At a completely retracted position, the crank arms extend rearwardly from their axis. In such a position, the outer ends of the crank arms protrude rearwardly beyond the framework, increasing the operative length of the machine.

It is therefore an object of my invention to provide such a stacking apparatus that may be constructed on a more compact scale than previously-known apparatus to thereby facilitate its installation in more restricted areas.

It is another object to provide such a lumber stacking apparatus wherein the driving crank linkage is operated about vertical axes and wherein responsive translational movement of the carriage is controlled so that it moves gradually outward from a course pickup station to a course stacking station, and quickly back from the course stacking station to the course pickup station It is a further object to provide such a stacking apparatus that may be utilized as either an integral hoist-type stacking machine or as a hoistless-type stacking machine.

An additional object is to provide a stacking apparatus that is very simple in operation and inexpensive to construct, so it provides a lower cost lumber stacker that is within the means of small specialty lumber producers.

These and other objects and advantages of this invention will become apparent upon reading the following detailed description with reference to the appended drawings.

BRIEF DESCRIPTION OF THE DRAWINGS

A preferred and alternate form of the present invention is illustrated in the accompanying drawings in which:

FIG. 5 is a plan view illustrating the alternate form of the stacking machine wherein the principal elements are arranged to enable its operation in a hoistless-type stacking arrangement;

FIG. 6 is an elevational side view of the form of stacking machine illustrated in FIG. 5;

FIG. 7 is an enlarged elevational fragmentary sectioned view illustrating a cam and follower arrangement utilized for controlling the raising and lowering movements of the course support means of the form shown in FIG. 5;

FIG. 8 is a fragmentary sectioned view taken along line 8—8 in FIG. 7;

FIG. 9 is a sectioned view taken along line 9—9 in FIG. 7; and

FIG. 10 is a schematic diagram illustrating various positions of a drive crank means utilized in both forms as the apparatus is operated to move the carriage between extended and retracted positions.

DETAILED DESCRIPTION OF A PREFERRED AND ALTERNATE EMBODIMENT

Figure 1:
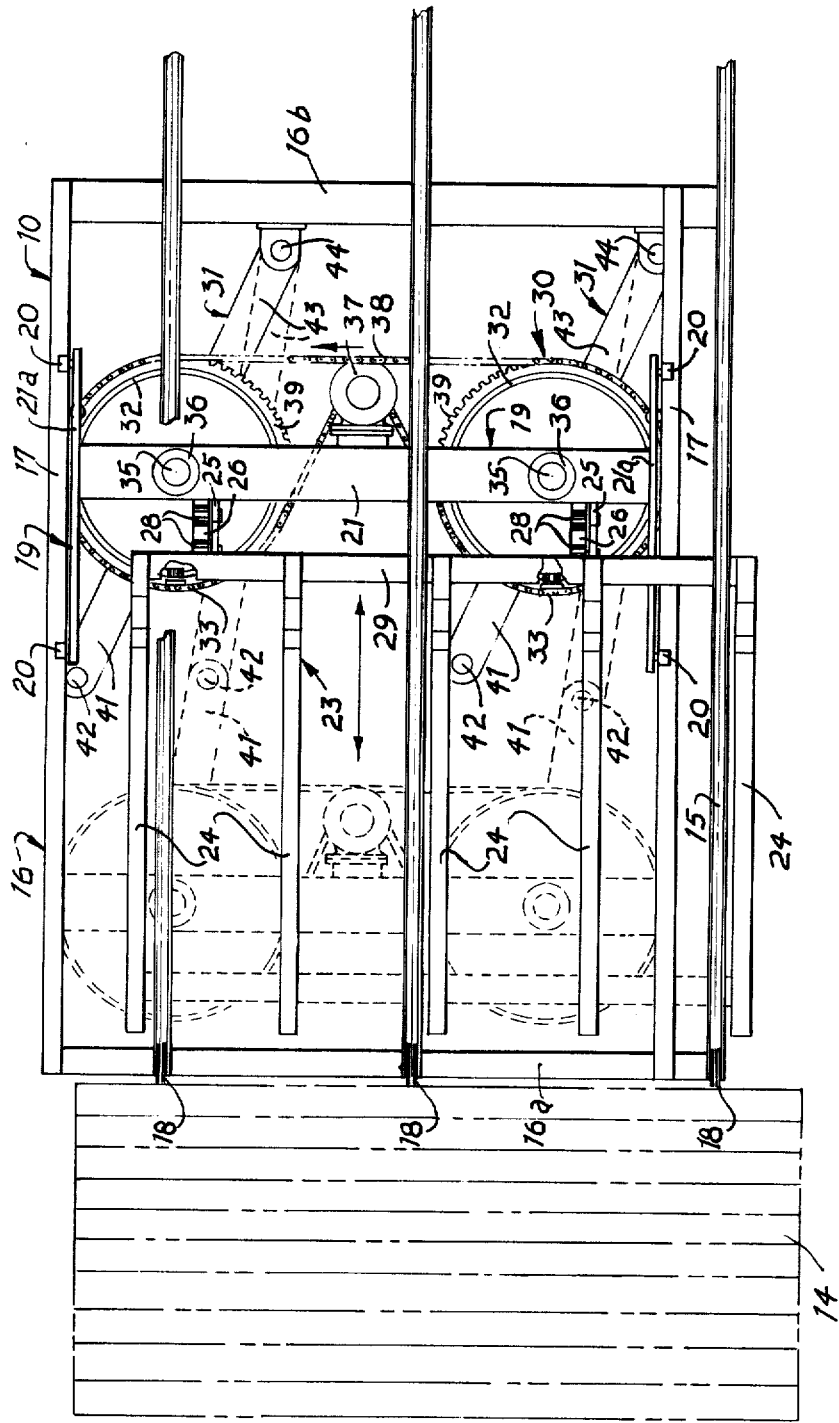
FIG. 1 is a plan view of a lumber stacking apparatus of the preferred form of the present invention.
Figure 2:
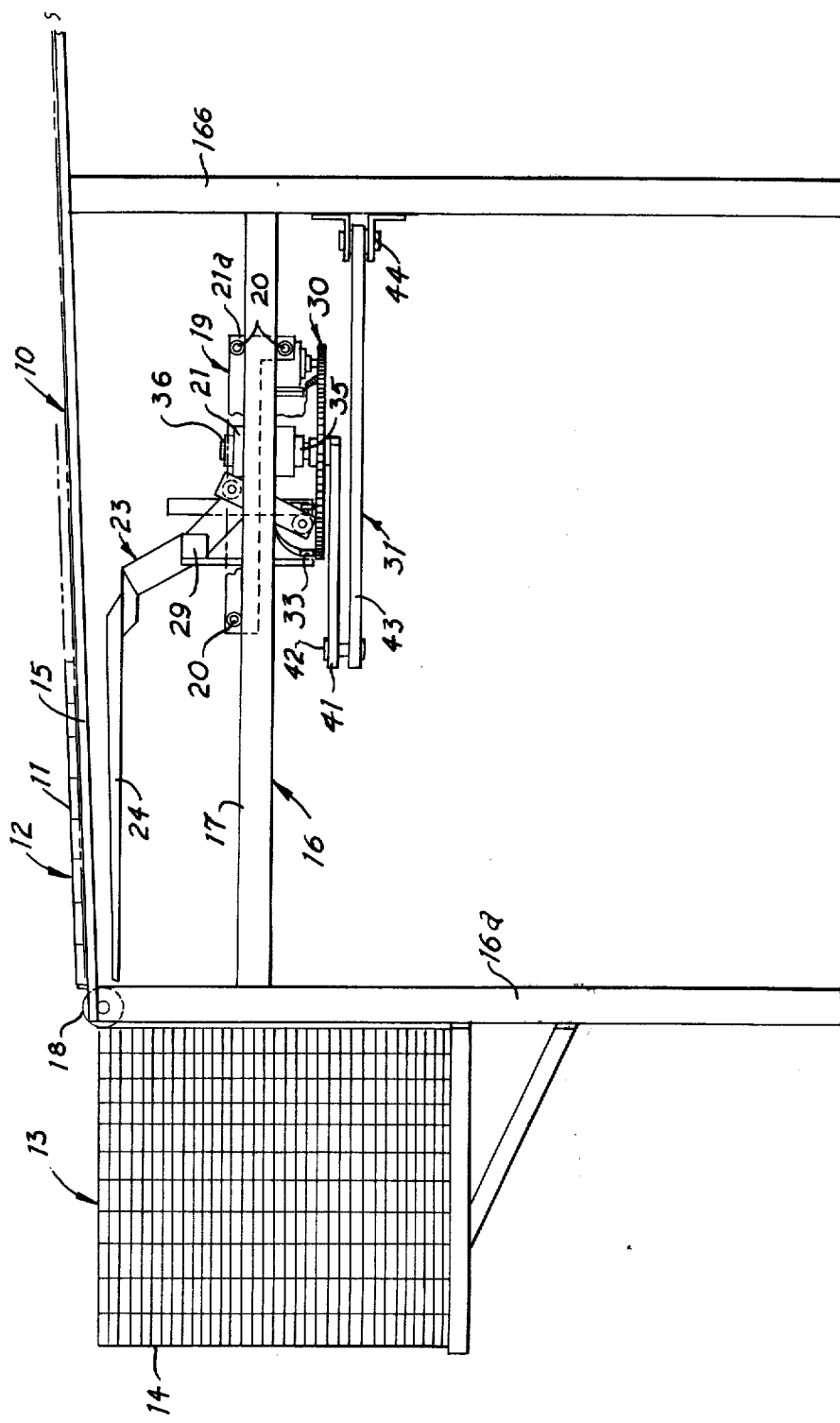
FIG. 2 is a side elevational view of the stacking apparatus illustrated in FIG. 1.
Figure 4:
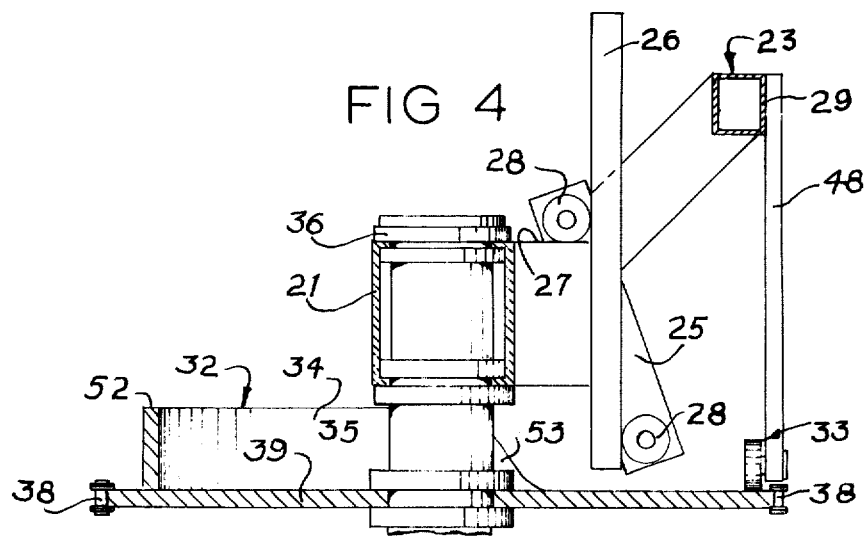
FIG. 4 is a sectioned view taken along line 4—4 in FIG. 3.

Preferred and alternate forms of the present lumber stacking apparatus are indicated in the drawings by reference numerals 10 and 100. The preferred form is shown as a hoist-type stacking apparatus 10 and is illustrated by FIGS. 1, 2 and 4. The alternate form is a hoistless-type lumber stacking apparatus 100 and is shown in FIGS. 5, 6, 7, 8 and 9. Both forms of the present apparatus are utilized for the purpose of receiving successive courses of boards 11 at course pickup station 12, 120 moving the courses of boards 11 to course stacking stations 13, 130 and depositing the successive courses onto an upright stack 14.

A preferred form of the apparatus is generally shown in FIGS. 1 and 2 including an upright framework 16. The successive layers of boards are received on an inclined support table 15 of framework 16 that extends between a forward frame end 16a and a rearward frame end 16b.

A carriage 19 is movably mounted on laterally-spaced horizontal tracks 17 of framework 16 for reciprocating movement therein between pickup station 12 and stacking station 13.

A course supporting means 23 is mounted on the carriage 19 for vertical movement thereon. Course support means 23 includes a plurality of forwardly-extending fork arms 24 that are utilized to engage and lift successive courses of boards.

A drive means 30 is provided operatively connecting carriage 19 to frame 16 to operate carriage 19 to reciprocate as described, and to move the course support means 23 upwardly and downwardly relative to carriage 19. More specifically, drive means 30 is utilized to: (1) move course support means 23 to an elevated position relative to the carriage at pickup station 12 in order to lift a course of boards from the support table 15; (2) move the carriage from pickup station 12 to stacking station 13 while simultaneously maintaining course support means 23 in the elevated position in order to carry the course to stacking station 13; (3) move course support means 23 downward at stacking station 13 to lower the course toward the top surface of the stack; and (4) move the carriage from the stacking station to the pickup station, stripping the layer against stripping members 18 at the forward end 16a of framework 16.

Carriage 19 is illustrated in considerable detail by FIGS. 1 and 2. It is movably mounted on tracks 17 on framework 16 for reciprocating translational movement thereon by means of a number of rollers 20 engaging tracks 17. As shown in FIG. 1, carriage 19 is somewhat I-shaped in configuration, having a transverse cross member 21 extending across framework 16 to longitudinal end sections 21a that rotatably mount rollers 20.

Course support means 23 is movably mounted to carriage 19 on a spaced pair of upright tracks 26. Tracks 26 are fixed rigidly to cross member 21. Support means 23 includes two pair of rollers 28, each mounted to a pair of roller yokes 25. The rollers engage forward and rearward facing sides of tracks 26. Roller yokes 25 are rigidly mounted to a transverse cross bar 29 that supports fork arms 24. Rollers 28 engage forward and rearward sides of tracks 26 at elevationally offset positions to provide stability to fork arms 24 which extend forwardly in a cantilevered condition from yokes 25.

Downward movement of course support means 23 is restricted by a horizontal abutment surface 27 of a bar extending between cross member 21 and tracks 26. The upper rollers 28 rest against surface 27 while course support means 23 is located in the lowered position as shown in FIG. 2. The positioning of surface 27 shown in the drawings is exemplary of only one location at which support means 23 may be held. For example, a rigid bar could extend between cross member 21 and cross bar 29.

Up and down movement of the course support means 23 relative to carriage 19 is affected by drive means 30. As generally disclosed above, drive means 30 is operatively connected between carriage 19, framework 16 and course support means 23. Basically, drive means 30 includes a double crank arrangement having a pair of laterally spaced crankshafts 35 with drive crank means 31 interconnecting the shafts 35 and the framework 16. A common motor 37 drives the crankshafts 35 in unison. The drive means 30 further includes cams 32 operatively connected to the crankshafts 35 for engaging respective cam followers 33 to vertically move the course support means 23.

Crankshafts 35 are mounted to cross member 21 of carriage 19 within appropriate bearings 36. Bearings 36 mount crankshafts 35 for free rotational movement about laterally spaced parallel vertical axes. These axes move in parallel vertical planes as carriage 19 is reciprocated between pickup station 12 and stacking station 13.

Motor 37 is operatively connected to crankshafts 35 by a chain 38. Chain 38 extends around sprockets 39 that are mounted for rotation with crankshafts 35. Motor 37 and chain 38 operate to rotate crankshafts 35 in unison, in the direction indicated by arrows in FIG. 10. Preferably, this motor 37 is operated at a constant rpm.

Drive crank means 31 is comprised of a pair of crank arms 41 and connecting links 43. Crank arms 41 are fixed to the crankshafts 35 for rotation therewith, while connecting links 43 are pivotably mounted to outer ends of the crank arms by crank pins 42. Connecting links 43 extend in horizontal planes from crank pins 42 to wrist pins 44 on frame 16. The axes of crank pins 42, wrist pins 44, and crankshafts 35 are all vertical to permit operation of drive crank means 31 in horizontal planes.

Movement of the carriage 19 between the pickup station 12 and stacking station 13 is affected as the motor 37 rotates crankshafts 35 and thereby crank arms 41 about their vertical axes. This motion is transmitted to the carriage through the connecting links 43, crank pins 42 and wrist pins 44. As the crankshafts 35 rotate, the carriage is moved as schematically illustrated in FIG. 10 between an extended and retracted position.

As may be noted in FIGS. 1 and 10, the axes of wrist pins 44 are laterally offset with respect to vertical planes in which the crankshafts axes move. This offset condition provides a forward stroke of the carriage during an angular movement of crank arms 41 of more than 180° and thereby enables a relatively slow outward progression of the carriage from course pickup station 12 to stacking station 13. The return or backward stroke must then be accomplished in less than 180° rotation of crank arms, thus enabling a relatively quick return of the carriage from stacking station 13 to pickup station 12. This feature is designed to provide for handling of individual courses so as not to disturb orientation of individual boards within the courses. A similar offset arrangement is described in greater detail in Lunden U.S. Pat. No. 3,737,052.

Although FIG. 10 illustrates the drive means 30 with the crankshafts rotating in similar rotational directions, it should be noted that the shafts may be easily rotated in opposite directions. In doing this, the wrist pins 44 may be offset in opposite directions from the respective vertical planes through which the axes of crankshafts 35 pass. This opposed offset distance from the respective axes would produce identical directional reciprocating forces through drive crank means 31 against carriage 19. The opposed rotation of crankshafts 35 and corresponding movement of the drive crank means would produce lateral forces against carriage 19 that would cancel each other and thereby reduce strain on framework 16.

An important feature of the present device is the provision for mounting crankshafts 35 for rotation about vertical axes on the movable carriage 19. This feature enables installation of the present device in areas providing less longitudinal clearance than that required by prior machines. As shown in FIG. 10, at no point in the operational cycle of drive means 30 is any part of drive crank means 31 protruding rearwardly beyond rearward frame end 16b. This feature is not possible with previous drive mechanisms. For example, in the Lunden U.S. Pat. No. 3,737,052, several carriage drive mechanisms are illustrated wherein the crank arms are mounted to the framework for rotation about fixed horizontal axes. The rotational movement of the crank arms in the previous machines is such that, at the course pickup station, the crank arms are located in rearwardly extended positions. As may be noted in FIGS. 1 and 10 of the present apparatus however, crank arms 41 face forwardly when the carriage is located at the pickup station, with their lengths being taken up within the distance between the forward and rearward ends of the frame.

The orientation of drive crank means 31 for operation in horizontal planes is also an important feature of the present invention. By rotating crank arms 41 about vertical axes, drive crank means 31 is operated in a horizontal plane that does not require elevational clearance for operation as does the apparatus of the patent cited above. It is easily understood that the length of crank arms 41 between their rotational axes and the axes of crank pins 42 determine the length of stroke or the distance of carriage movement between pickup station 12 and stacking station 13. In the prior apparatus, it was found that by lengthening the crank arms to produce a corresponding lengthened stroke, the course support table must be raised a distance corresponding to the increased length of the crank arms. This increased distance is necessary to provide clearance between the bottom surfaces of the layers of boards being moved onto the apparatus and the crank arms as they rotate about the fixed horizontal axis. In the present apparatus, with the crank arms 41 mounted to the movable carriage and operative about vertical axes, the only operational restriction for lengthening the crank arms is the horizontal space requirements of the installation area, allowing for the lateral swing of crank arms 41.

Drive means 30 operates to move support means upwardly and downwardly by means of a pair of cams 32 and followers 33. Cams 32 may be described as "edgewise" or "crown" cams, with each including an axially facing working surface 34 for engaging followers 33. Followers 33 are rigidly mounted to course support means 23 by upright bars 48. Surfaces 34 are rigidly connected to crankshafts 35 so their rotation will result in corresponding upward and downward movement of the course support means 23 in relation to carriage 19.

Figure 3:
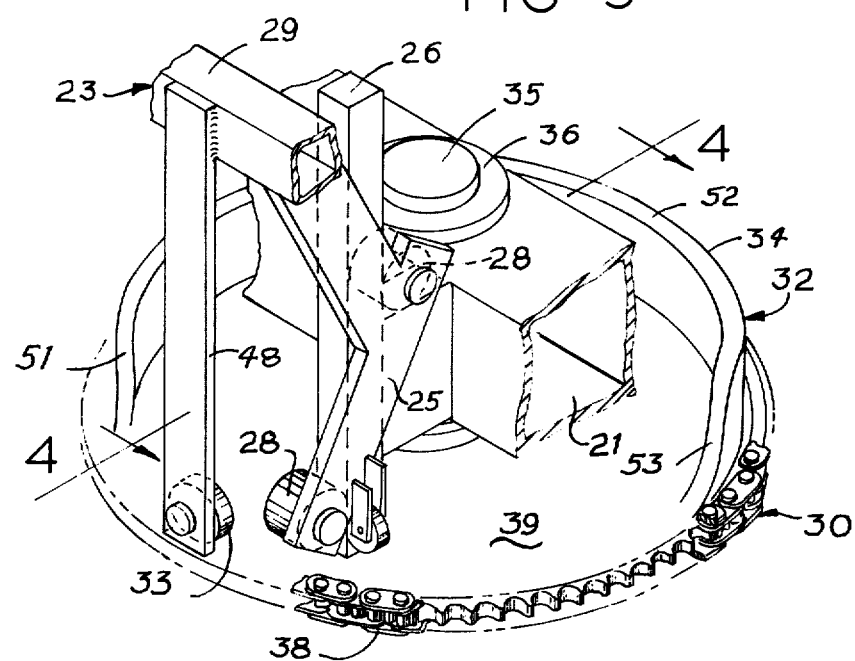
FIG. 3 is an enlarged fragmentary pictorial view of the portion of the present invention utilized to raise and lower the course support means.

Cams 32 and followers 33 are illustrated in some detail in FIGS. 3 and 4. As shown, cams 32 are mounted to sprockets 39. They may however be designed as individual elements such as those shown in FIGS. 7, 8 and 9 of the alternate embodiment. Each cam 32 also includes a curved portion 51 which, as crankshafts 35 rotate, serve to raise the course support means 23 to the elevated position. An elongated flat surface 52 is utilized to maintain the course support means in a raised position as drive crank means 31 moves carriage 19 and course support means 23 to stacking station 13.

It may be noted at this point that cams 32 needn't be designed with surface 52 being flat. Other configurations, such as a constant axial slope along surface 52, could serve to lower the course gradually as the course support means is moved forwardly toward stacking station 13.

Upon reaching course stacking station 13, a second curve portion 53 of cam 32 allows the support means 23 to move downwardly to a position adjacent the surface of stack 14 in front of stripping members 18. Abutment surface 27 prevents further downward movement of course support means, once it reaches the lowered position and is retracted from stacking station 13 to pickup station 13. During this motion, the layer is moved against stripping members 18 and stripped from fork arms 24 and onto the stack 14. Carriage 19 and support means 23 are then moved rearwardly in apprehension of handling the next successive layer. After full retraction, the stack 14 is automatically indexed downwardly to maintain the top of stack 14 at a constant elevation.

Reference will now be made in greater detail to stacking apparatus 100 of the second embodiment as illustrated in FIGS. 6–9. This form of stacking apparatus is often referred to as a hoistless stacking machine since the stack of lumber being formed thereby is not supported on a hoist that moves incrementally downwardly after each layer is deposited.

Stacking apparatus 100 includes an upright framework 116 with an upwardly facing inclined support table 115 extending between forward frame end 116a and a rear frame end 116b. Successive layers of boards are received on table 115 at a course pickup station 112. Like the apparatus of the preferred form described above, stacking apparatus 100 is utilized to move successive courses of boards from pickup station 112 to a course stacking station 113 and deposit the successive courses onto a stack.

A carriage 119 is movably mounted on two pair of laterally spaced tracks 117 of framework 116, for reciprocating movement thereon between pickup station 112 and stacking station 113.

A course support means 123 is mounted on carriage 119 for vertical movement in relation thereto. Combined with the reciprocating movement of carriage 119, support means 123 moves about a substantially rectangular path as indicated by arrows in FIG. 6. Support means 123 includes a plurality of forwardly-extending fork arms 124 that are utilized to engage and lift successive courses of boards.

A drive means 130 is provided, operatively connecting carriage 119 to frame 116 in order to reciprocate the carriage as described and to move course support means 123 upwardly and downwardly relative to the carriage 119. More specifically, drive means 130 is utilized to: (1) move course support means 123 to an elevated position engaging a course of boards on the fork arms 124 at pickup station 112; (2) move the carriage 119 and course support means 123 from pickup station 112 to stacking station 113 while maintaining the elevated position of course support means 123; (3) release course support means 123 at stacking station 113, allowing it to move downwardly toward the top surface of the stack; and (4) move the carriage 119 and course support means 123 from the stacking station 113 toward pickup station 112 stipping the layer against stripping members 118 at forward end 116a of framework 116.

Carriage 119 is illustrated in considerable detail by FIGS. 5 and 6. It is movably mounted to tracks 117 on framework 116 for reciprocating translational movement thereon. Carriage 119 includes a plurality of rollers 120 for engaging tracks 117 to allow free reciprocating movement of the carriage 119 along a translational path. Carriage 119 also includes vertically spaced parallel cross members 121 that extend across framework 116 to longitudinal end sections 121a that mount rollers 24 for free rotation along tracks 117.

Course support means 123 is movably mounted to carriage 119 on a spaced pair of upright tracks 126. Tracks 126 are fixed rigidly to cross members 121. Support means 123 also includess two pair of rollers 128 mounted to roller yokes 125 for engaging tracks 126. Roller yoke 125 is rigidly mounted to a common cross bar 129 that also supports fork arms 124. Rollers 128 engage forward and rearward sides of track 126 at elevationally offset positions to provide stability to fork arms 124 which extend forwardly in a cantilevered condition from yokes 125.

Up and down movement of course support means 123 and reciprocating movement of carriage 119 is affected by drive means 130 as generally disclosed above. Drive means 130 is operatively connected between carriage 119, framework 116, and course support means 123. Drive means 130 basically is comprised of a cam means 132, a follower 133, a drive crank means 131, a pair of crankshafts 135, and a motor 137. A second motor 162 and counterweight mechanism 155 is also provided in this embodiment to assist with upward and downward movement of the course support means 123.

Crankshafts 135 are mounted to cross members 121 of carriage 119 within appropriate bearings 136. Bearings 136 mount crankshafts 135 for free rotational movement about parallel vertical axes. These axes move in parallel vertical planes as carriage 119 is reciprocated between pickup station 112 and stacking station 113.

Motor 137 is operatively connected to crankshafts 135 by a chain 138. Chain 138 extends around sprockets 139 that are mounted for rotation with crankshafts 135. Motor 137 and chain 138 operate to rotate crankshafts 135 in unison in the direction indicated by arrows in FIG. 10.

It may be noted at this point that FIG. 10 is illustrative of both the preferred and alternate embodiments of the present invention, describing schematically the operation of drive crank means 31 and 131.

Drive crank means 131 is comprised of a pair of crank arms 141 and connecting links 143. Crank arms 141 are fixed to the crankshafts 135 for rotation therewith, while connecting links 143 are pivotably mounted to outer ends of crank arms 141 by crank pins 142. Connecting links 143 extend in horizontal planes from crank pins 142 to wrist pins 144 on frame 116. The axes of crank pins 142, wrist pins 144, and crankshafts 135 are all vertical to permit operation of drive crank means 131 within a horizontal plane. As may be noted in FIG. 6, the horizontal plane of operation of the alterenate form of this invention is located closely adjacent the supporting ground surface. This presents a distinct advantage, since the location of drive crank means 131 enables its placement beneath a floor surface for safety purposes and at an elevation where ease in maintenance and servicing is optimum.

Reciprocating movvement of carriage 119 between pickup station 112 and stacking station 113 is affected by drive means 130 identically as drive means 30 of the preferred form previously described moves carriage 19 between pickup station 12 and stacking station 13. The only difference between drive means 30 and 130 is the elevational location of drive crank means 131.

Both forms of my invention are shown with the wrist pins 44, 144 mounted at the rear frame ends 16b and 116b respectively. It may be desirable however to mount the wristpins 44, 144 at the forward frame ends 16a, 116a. This reversed arrangement would also reverse the acceleration characteristic of the support means, allowing for a dwell period of course support means 23 and 123 at stacking stations 13 and 113 (as determined by the offset of the wristpin and crankshaft axes with respect to the path of the course support means). Otherwise, if the wristpins are mounted as shown, the dwell will occur at pickup stations 12, 112.

Drive means 130 partially operates to move course support means 123 upwardly and downwardly by means of a pair of cams 132 and followers 133. Remaining vertical movement is accomplished by motor 162 and counterweight mechanism 155. Cams 132 are somewhat similar to cams 32 of the preferred form. Cams 132 are illustrated in FIGS. 7, 8 and 9. In this form, angular areas between curved cam portions 151 and 153 are left open (FIG. 9) to allow free vertical passage of support means 123 downwardly at stacking station 113. The open areas also allow upward movement of support means 123 to the position illustrated by solid lines in FIG. 6 at pickup station 112. At this position, working surfaces 134 of cams 132 may operatively engage followers 133 to cause fork arms 124 to raise to an elevated position, picking up the next successive layer of boards, maintaining the boards at the elevated position as carriage 119 is moved to stacking station 113, and allow fork arms 124 to lower into contact with the upper surface of a stack at stacking station 113.

The drive means 130 further includes a counterweight arrangement 159 that is operatively connected to support means 123 in cooperation with a drive motor 162 to assist vertical movement of support means 123. Drive motor 162 and counterweight arrangement 159 is provided to assist vertidal movement of support means 123 other than that imparted by cams 132. The counterweight 159 and motor 162 are conventionally known-type arrangements for assisting vertical movement of fork arms 124 at stacking station 113 and at pickup station 112. Detailed description of elements comprising the counterweight assembly 159 and motor 162 will therefore be omitted except for their functions which are described below.

Operation of the alternate form of the present apparatus may best be understood with reference to FIG. 6. A starting condition of stacking apparatus 100 is shown in FIG. 6 by solid lines. As drive means 130 operates to move carriage 119 forwardly, cam means 132 is also operated to rotate against follower 133. Working surfaces 134 include curved portions 151 which serve to move the course support means 123 upwardly to engage the course and lift it to an elevated position. As the carriage 119 moves forwardly, flat surfaces 152 of the cams 132 rotate into engagement with followers 133. The flat surfaces 152 serve to maintain course support means 123 at the elevated condition as the course is moved from pickup station 112 to stacking station 113.

At stacking station 133, cam 132 is rotated to bring second curved surfaces 153 into engagement with followers 133. Surfaces 153 allow course support means to be lowered again to the intermediate position. Rotation of cams 132 beyond cam surface 153 brings followers 133 into to open portions, allowing course support means 123 to move downwardly toward engagement with the top of a stack. This downward movement is assisted by counterweight mechanism 155 and motor 162. Motor 162 is appropriately controlled to prevent upward movment of the fork arms 124 as carriage 199 is retracted. Once carriage 119 is fully retracted to strip the course of boards against members 118 and onto a stack, motor 162 is automatically operated to raise course support means 123 to the intermediate position as shown, in apprehension of the next successive stacking cycle.

It should be understood that the above-described embodiments are simply illustrative of the principles of this invention and that numerous other embodiments may be readily devised by those skilled in the art without deviating therefrom. Therefore only the following claims are intended to define this invention.

What I claim is:

1. A lumber stacking apparatus for receiving a course of boards at a course pickup station and for successively moving the courses of boards to a course stacking station and stacking the courses one on top of the other to form a lumber stack, comprising:
   a. a frame;
   b. a carriage movably mounted on the frame for reciprocating in a horizontal direction between the courses pickup station and the course stacking station;
   c. course support means mounted on the carriage for reciprocating movement with the carriage and for up and down movement relative to the carriage;
   d. drive means operatively connected to the carriage, frame, and course support means for: (1) moving the course support means relative to the carriage to an elevated position at the course pickup station to pick up a course of boards; (2) moving the carriage from the course pickup station to the course stacking station while maintaining the support means in the elevated position to carry the course to the course stacking station; (3) moving the course support means downward at the course stacking station to lower the course; and (4) moving the carriage from the stacking station to the pickup station to prepare for a subsequent course of boards; said drive means comprising:
   e. a crankshaft supported for rotation about a vertical crankshaft axis;
   f. drive crank means operatively connecting the crnakshaft, the frame and the carriage, and movable in a substantially horizontal plane for reciprocating the carriage in a translational path;
   g. a cam follower operatively connected to the course support means;
   h. cam means operatively connected to the crankshaft for engaging the cam follower as the crankshaft is being rotated to sequentially raise the course support means to the elevated position at the course pickup station, maintain the course support means elevated as the carriage is moved from the course support station to the course stacking station, and finally lower the course support means at the course support station; and
   i. a motor operatively connected to the crankshaft for rotating the crankshaft about the vertical crankshaft axis to reciprocate the carriage and raise and lower the course support means.

2. The lumber stacking apparatus as defined in claim 1 wherein the crankshaft is rotatably mounted on the carriage with the drive crank means extending from the crankshaft to a wrist pin connection affixed on the frame.

3. The stacking apparatus set out in claim 2 wherein the crankshaft is located on the carriage with its vertical axis maintained in a vertical plane parallel to the translational path of the carriage.

4. The lumber stacking apparatus defined in claim 3 wherein the drive crank means includes a connecting link pivotally connected to the frame at the wrist pin connection for pivotal movement about a vertical wrist pin axis.

5. The lumber stacking apparatus as defined in claim 4 wherein the vertical wrist pin axis is laterally offset from the vertical crankshaft axis with reference to the vertical plane, to increase the period of forward stroke of the carriage from the course pickup station to the course stacking station and to decrease the period of the rearward stroke of the carriage from the course stacking station to the course pickup station.

6. The stacking apparatus set out in claim 4 wherein the drive crank means includes a crank arm affixed to the crankshaft that extends therefrom to an outer end pivotably mounted to the connecting link by a crank pin.

7. The stacking apparatus set out in claim 6 wherein the distance between the vertical crankshaft axis and the crank pin is less than the distance between the crank pin and vertical wrist pin axis.

8. The stacking apparatus set out in claim 2 wherein the cam is mounted to the crankshaft for rotation therewith and the cam follower is fixed relative to the course support means, said support means being vertically movable along an upright guide track affixed to the carriage.

9. The stacking apparatus set out in claim 8 wherein the cam includes a cam face extending coaxially about the crankshaft axis to effect axial movement of the follower with respect to the crankshaft axis.

10. The stacking apparatus set out in claim 6 wherein the motor is mounted to the carriage and is connected to the crankshaft by a sprocket and roller chain assembly..

11. The stacking apparatus set out in claim 2 wherein the drive means further comprises a second crankshaft on the carriage parallel to the laterally spaced from the first named crankshaft with respect to the translational path in which the second crankshaft is operatively connected to the frame by a second drive crank means at a second wrist pin on the frame for pivotal movement about a second vertical wrist pin axis spaced laterally from the first named wrist pin with respect to the translational path; said second drive crank means corresponding to the first-named drive crank means;

and wherein said motor is mounted to the carriage and is operatively connected to both crankshafts for affecting their rotation in unison.

12. The stacking apparatus set out in claim 11 further including a second cam mounted on the second crankshaft for rotation therewith, and a second follower affixed to the course support means to engage the second cam; and said second cam operatively corresponding to said first-named cam.

* * * * *